US012192721B2

(12) United States Patent
Zhang et al.

(10) Patent No.: US 12,192,721 B2
(45) Date of Patent: Jan. 7, 2025

(54) SOUND DEVICE

(71) Applicant: AAC Microtech (Changzhou) Co., Ltd., Changzhou (CN)

(72) Inventors: Long Zhang, Shenzhen (CN); Xiwen Du, Shenzhen (CN); Lipeng Ma, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 237 days.

(21) Appl. No.: 18/091,352

(22) Filed: Dec. 29, 2022

(65) Prior Publication Data

US 2024/0073609 A1 Feb. 29, 2024

Related U.S. Application Data

(63) Continuation of application No. PCT/CN2022/114687, filed on Aug. 25, 2022.

(51) Int. Cl.
*H04R 7/02* (2006.01)
*H04R 9/02* (2006.01)

(52) U.S. Cl.
CPC ............... *H04R 7/02* (2013.01); *H04R 9/025* (2013.01)

(58) Field of Classification Search
CPC ................................. H04R 7/02; H04R 9/025
See application file for complete search history.

(56) References Cited

U.S. PATENT DOCUMENTS 4,949,386 A * 8/1990 Hill ........................ H04R 1/026 381/189
2017/0303024 A1* 10/2017 Sato ......................... H04R 7/02
2018/0063637 A1* 3/2018 Choi ...................... H04R 9/025

* cited by examiner

*Primary Examiner* — Suhan Ni
(74) *Attorney, Agent, or Firm* — W&G Law Group

(57) ABSTRACT

The present disclosure discloses a sound device a frame; a vibration system supported on the frame; a magnetic system with a magnetic gap supported on the frame; the vibration system includes a diaphragm assembly having a diaphragm and a coil inserted in the magnetic gap to drive the diaphragm for sound generation; the diaphragm assembly includes a diaphragm holder fixed to the frame and the diaphragm fixed to the diaphragm holder for sound generation; the diaphragm includes a first flat part having an opening, a folded ring part in the shape of a ring on the outside of the first flat part, and an attachment part on the outside of the folded ring part and fixedly connected to the diaphragm holder; the diaphragm assembly also includes a waterproof breathable film fixed to the first flat part, the first flat part includes a first inner edge away from the folded ring part; observed along the vibration direction, the first inner edge is located on the inner side of the coil, and an outer edge of the waterproof breathable film is located on the outer side of the coil. The sound device in the present disclosure has better waterproof performance.

9 Claims, 5 Drawing Sheets

A-A

A-A

SOUND DEVICE

FIELD OF THE PRESENT DISCLOSURE

The present disclosure relates to electro-acoustic transducers, especially relates to a sound device applied in electronic speaker products.

DESCRIPTION OF RELATED ART

Sound device, also known as speakers or horns, are used in speakers to realize the conversion of audio signals into sound for playback.

The sound device of the related arts comprises a frame, a vibration system fixed to said frame and a magnetic system having a magnetic gap, said magnetic system driving said vibration system, said vibration system comprising a diaphragm fixed to said frame, a dome affixed to said diaphragm, and a coil inserted in said magnetic gap.

However, in the related arts, the rear chamber is set to be airtight in order to improve the waterproof performance, and the air pressure in the rear chamber becomes larger after the temperature rises, and the loudness decreases, and the sound generation effect is not good. In the related arts, the solution of partially opening holes in the dome and pasting waterproof breathable membrane is also disclosed, which has more parts, more complicated assembly, and more positions to achieve waterproof function, which easily causes waterproof failure.

Therefore, it is necessary to provide an improved sound device to overcome the problems mentioned above.

SUMMARY OF THE INVENTION

The present disclosure provides a sound device with good water resistance and better sound generation performance.

The sound device comprising: a frame; a vibration system supported on the frame; a magnetic system with a magnetic gap supported on the frame; the vibration system includes a diaphragm assembly having a diaphragm and a coil inserted in the magnetic gap to drive the diaphragm for sound generation; the diaphragm assembly includes a diaphragm holder fixed to the frame and the diaphragm fixed to the diaphragm holder for sound generation; the diaphragm includes a first flat part having an opening, a folded ring part in the shape of a ring on the outside of the first flat part, and an attachment part on the outside of the folded ring part and fixedly connected to the diaphragm holder; the diaphragm assembly also includes a waterproof breathable film fixed to the first flat part, the first flat part includes a first inner edge away from the folded ring part; observed along the vibration direction, the first inner edge is located on the inner side of the coil, and an outer edge of the waterproof breathable film is located on the outer side of the coil.

Further, the waterproof breathable film is fixed on the side of the first flat part near the magnetic system.

Further, the diaphragm also includes a second flat part which is provided on the side of the first flat part near the magnetic system, and the second flat part is connected to the folded ring part and parallel to the first flat part, and the outer edge of the waterproof breathable film is sandwiched between the first flat part and the second flat part.

Further, the magnetic system includes a main magnet and two secondary magnets provided on both sides of the main magnet along the short axis direction of the sound device, and the magnetic gap is formed between the secondary magnets and the main magnet, and the first flat part is partially overlapped with the main magnet and the secondary magnets when viewed along the vibration direction.

Further, the magnetic system also includes an upper clamp and a lower clamp fixed to the frame, and the secondary magnet sandwiched between the upper clamp and the lower clamp.

Further, the magnetic system also includes a pole, and the main magnet is sandwiched between the pole and the lower clamp.

Further, the diaphragm assembly also includes a seal set on the outside of the diaphragm holder.

Further, the direction of the curved concave of the folded ring part is in the direction close to the coil.

Further, the waterproof breathable film includes a waterproof layer and a metal mesh layer, the waterproof layer is provided on the side of the metal mesh layer away from the magnetic system.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
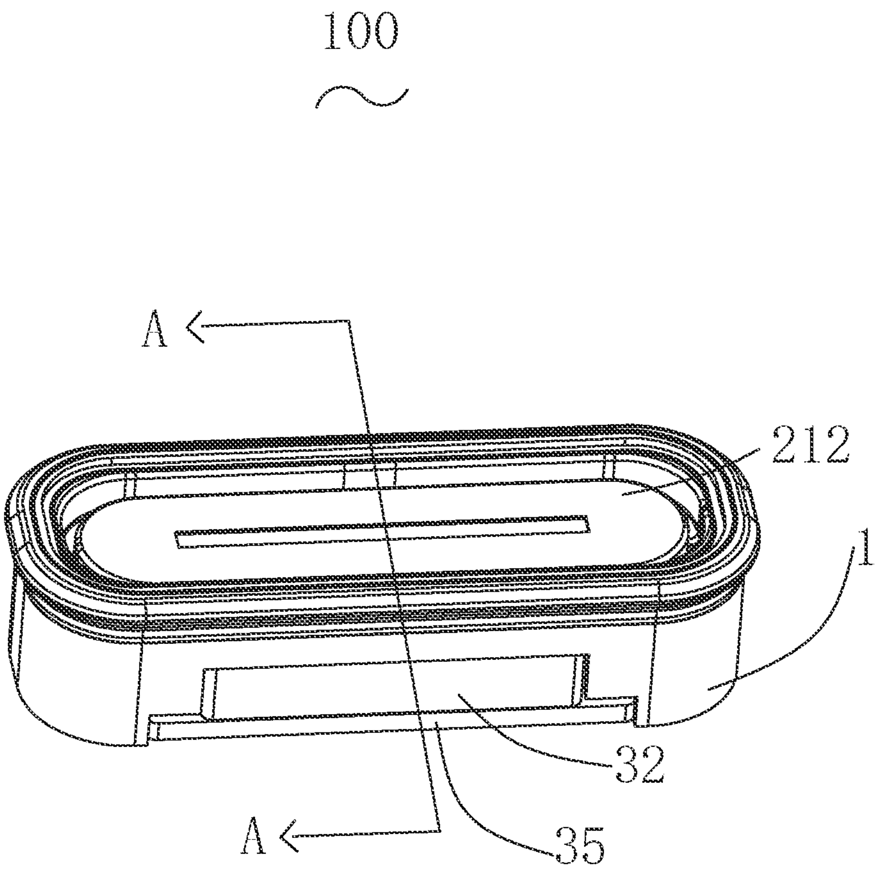
FIG. 1 is a structure schematic of a sound device in accordance with an exemplary embodiment of the present disclosure.
Figure 2:
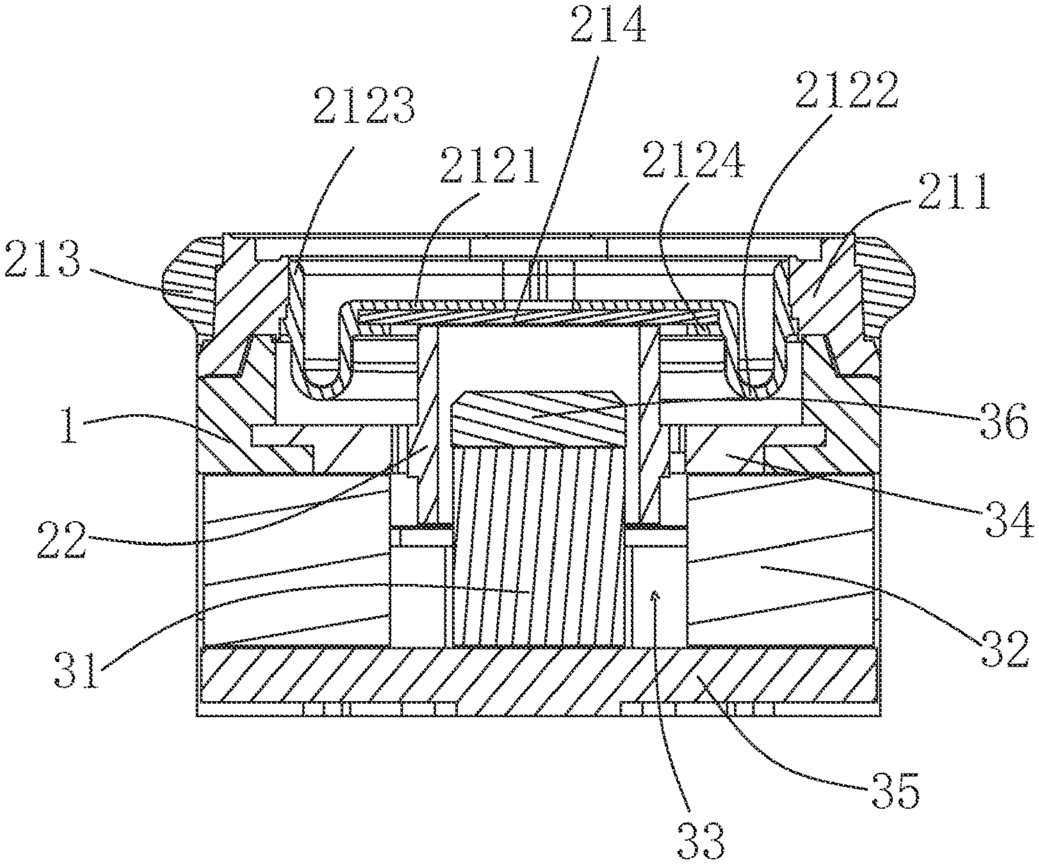
FIG. 2 is a cross-sectional view of the sound device taken along line A-A in FIG. 1.
Figure 3:
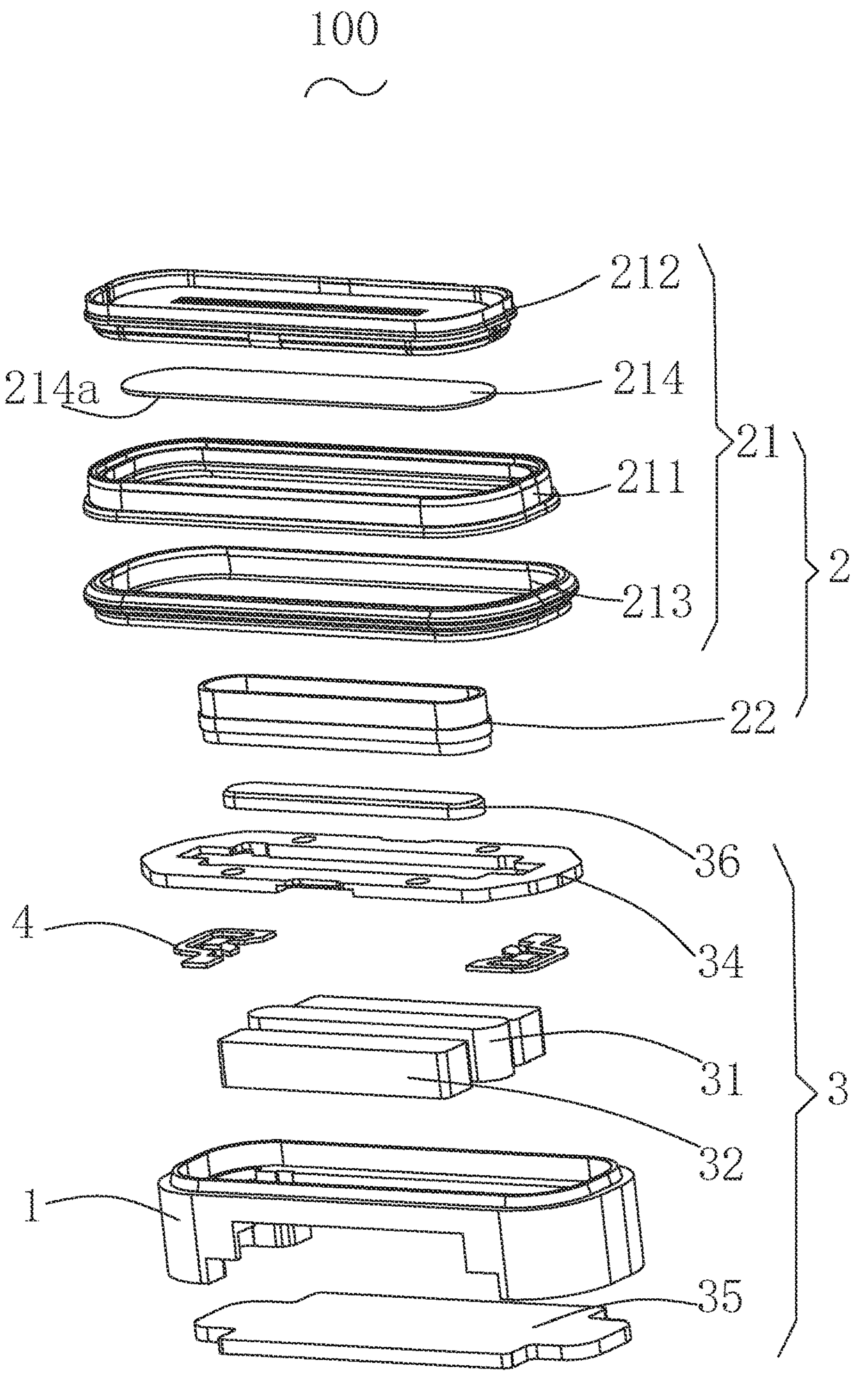
FIG. 3 is an exploded view of the sound device in FIG. 1.
Figure 4:
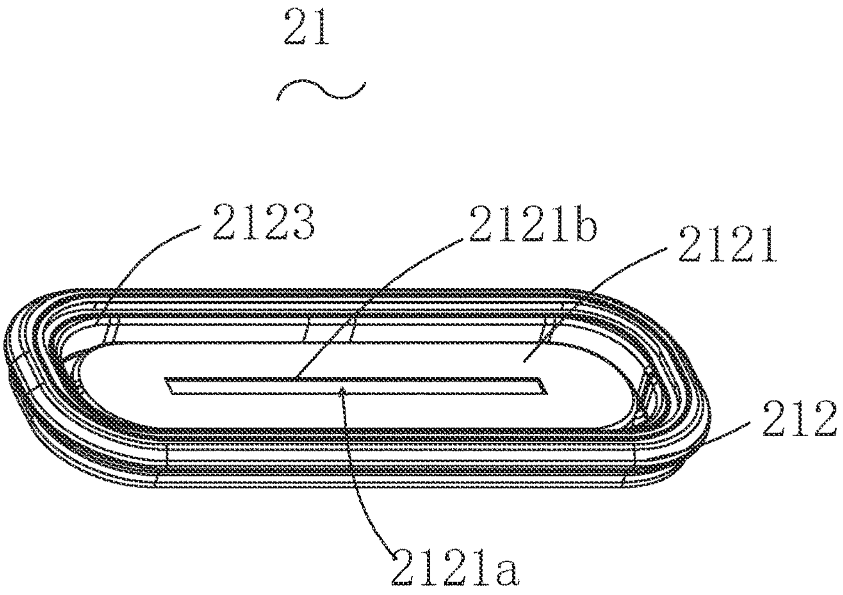
FIG. 4 is a schematic diagram of the structure of the diaphragm assembly.
Figure 5:
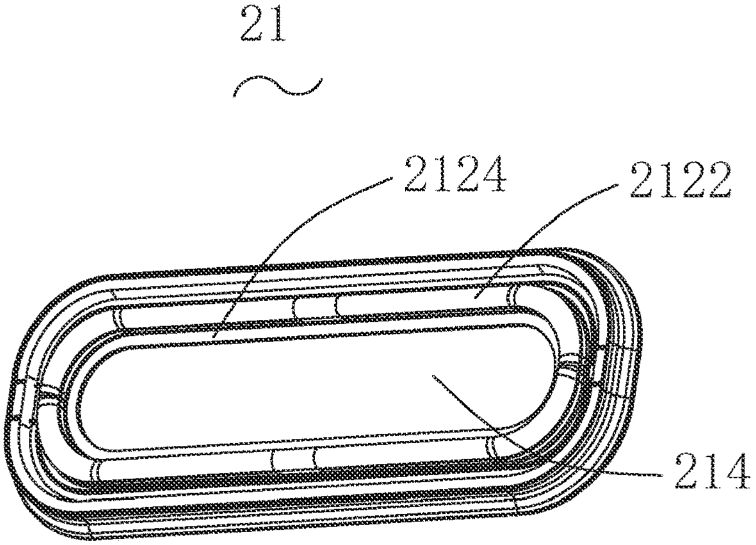
FIG. 5 is a schematic diagram of the structure of another view of the diaphragm assembly.
Figure 6:
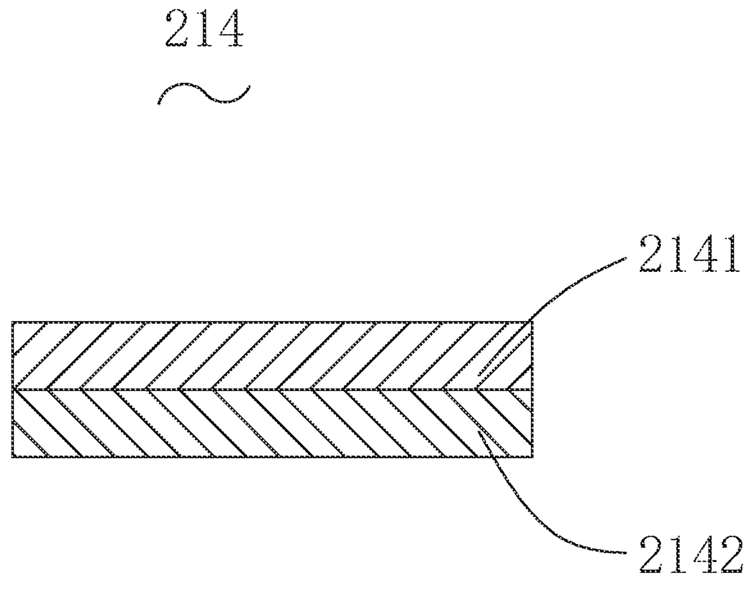
FIG. 6 is a schematic diagram of the structure of waterproof breathable membrane.

Please refer to FIGS. 1-6 together, a sound device 100 provided by an exemplary embodiment of the present disclosure includes a frame 1, a vibration system 2 supported on the frame 1, a magnetic system 3 with magnetic gap 33 supported on the frame 1, and a circuit board 4 for electrical connection. The vibration system 2 includes a diaphragm assembly 21 having a diaphragm 212 and a coil 22 inserted in the magnetic gap 33 to drive the diaphragm 212 to vibrate and sound. The diaphragm assembly 21 includes a diaphragm holder 211 fixed to the frame 1 and the diaphragm 212 fixed to the diaphragm holder 211 for sound generation. The diaphragm 212 includes a first flat part 2121 having an opening 2121*b*, a folded ring part 2122 in the shape of a ring on the outside of the first flat part 2121, and an attachment part 2123 on the outside of the folded ring part 2122 and fixedly connected to the diaphragm holder 211. The diaphragm assembly 21 also includes a waterproof breathable film 214 fixed to the first flat part 2121, the first flat part 2121 includes a first inner edge 2121*a* away from the folded ring part 2122. Observed along the vibration direction, the first inner edge 2121*a* is located on the inner side of the coil 22, and the outer edge 214*a* of the waterproof breathable film 214 is located on the outer side of the coil 22, increasing the width of the waterproof seal and providing better waterproof performance.

In this embodiment, the waterproof breathable film 214 includes a waterproof layer 2141 and a metal mesh layer 2142, the waterproof layer 2141 is provided on the side of the metal mesh layer 2142 away from the magnetic system 3, and the material of the waterproof layer 2141 is Teflon. In other optional embodiments, the waterproof layer 2141 may also be provided on the side of the metal mesh layer 2142 near the magnetic system 3.

In this embodiment, the waterproof breathable film 214 is fixed on the side of the first flat part 2121 near the magnetic system 3, making the connection between the waterproof breathable film and the first flat part more solid and less likely to fall off. In other optional embodiments, the waterproof breathable film may also be secured to the side of the first flat portion away from the magnetic circuit system.

In this embodiment, the diaphragm assembly 21 also includes a seal 213 set on the outside of the diaphragm holder 211 for enhancing the overall waterproof performance of the sound device 100. In other optional embodiments, it is also possible not to set the seal ring, but to design the whole waterproof function on the parts that cooperate with the sound device according to the design requirements of the electronic equipment.

The diaphragm 212 also includes a second flat part 2124 which is provided on the side of the first flat part 2121 near the magnetic system 3, and the second flat part 2124 is connected to the folded ring part 2122 and parallel to the first flat part 2121, and the outer edge 214*a* of the waterproof breathable film 214 is sandwiched between the first flat part 2121 and the second flat part 2124 to further enhance the waterproof performance of the sound device 100.

In this embodiment, the direction of the curved concave of the folded ring part 2122 is in the direction close to the coil 22. In other embodiments, the direction of the curved concave of the folded ring part may also be in the opposite direction, i.e., in the direction away from the coil.

The magnetic system 3 includes a main magnet 31 and two secondary magnets 32 provided on both sides of the main magnet 31 along the short axis direction of the sound device, and the magnetic gap 33 is formed between the secondary magnets 32 and the main magnet 31, and the first flat part 2121 is partially overlapped with the main magnet 31 and the secondary magnets 32 when viewed along the vibration direction, and the waterproof area can cover the magnetic gap 33 to improve the waterproof performance of the sound device 100.

The magnetic system 3 also includes an upper clamp 34 and a lower clamp 35 fixed to the frame 1, with a secondary magnet 32 sandwiched between the upper clamp 34 and the lower clamp 35 and a main magnet 31 fixed to the lower clamp 35. The magnetic system 3 also includes a pole 36, and the main magnet 31 is sandwiched between the pole 36 and the lower clamp 35.

Compared with the related art, the sound device of the present disclosure includes a frame, a vibration system supported on the frame, a magnetic system with magnetic gap supported on the frame. The vibration system includes a diaphragm assembly having a diaphragm and a coil inserted in the magnetic gap to drive the diaphragm to vibrate and sound. The diaphragm assembly includes a diaphragm holder fixed to the frame and the diaphragm fixed to the diaphragm holder for sound generation. The diaphragm includes a first flat part having an opening, a folded ring part in the shape of a ring on the outside of the first flat part, and an attachment part on the outside of the folded ring part and fixedly connected to the diaphragm holder. The diaphragm assembly also includes a waterproof breathable film fixed to the first flat part. The first flat part includes a first inner edge away from the folded ring part. Observed along the vibration direction, the first inner edge is located on the inner side of the coil, and the outer edge of the waterproof breathable film is located on the outer side of the coil. As a result, the dome design is eliminated and the waterproof breathable film is used directly as a dome. The sealing width between the diaphragm and the waterproof breathable film is larger, the waterproof performance is better, there are fewer parts, the assembly is simpler, and the location to achieve the waterproof function is reduced, reducing the risk of waterproof failure.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:
- a frame;
- a vibration system supported on the frame;
- a magnetic system with a magnetic gap supported on the frame;
- the vibration system includes a diaphragm assembly having a diaphragm and a coil inserted in the magnetic gap to drive the diaphragm for sound generation;
- the diaphragm assembly includes a diaphragm holder fixed to the frame and the diaphragm fixed to the diaphragm holder for sound generation;
- the diaphragm includes a first flat part having an opening, a folded ring part in the shape of a ring on the outside of the first flat part, and an attachment part on the outside of the folded ring part and fixedly connected to the diaphragm holder;
- the diaphragm assembly also includes a waterproof breathable film fixed to the first flat part, the first flat part includes a first inner edge away from the folded ring part; observed along the vibration direction, the first inner edge is located on the inner side of the coil, and an outer edge of the waterproof breathable film is located on the outer side of the coil.

2. The sound device as described in claim 1, wherein the waterproof breathable film is fixed on the side of the first flat part near the magnetic system.

3. The sound device as described in claim 2, wherein the diaphragm also includes a second flat part which is provided on the side of the first flat part near the magnetic system, and the second flat part is connected to the folded ring part and parallel to the first flat part, and the outer edge of the waterproof breathable film is sandwiched between the first flat part and the second flat part.

4. The sound device as described in claim 3, wherein the magnetic system includes a main magnet and two secondary magnets provided on both sides of the main magnet along the short axis direction of the sound device, and the magnetic gap is formed between the secondary magnets and the main magnet, and the first flat part is partially overlapped with the main magnet and the secondary magnets when viewed along the vibration direction.

5. The sound device as described in claim 4, wherein the magnetic system also includes an upper clamp and a lower clamp fixed to the frame, and the secondary magnet sandwiched between the upper clamp and the lower clamp.

6. The sound device as described in claim 5, wherein the magnetic system also includes a pole, and the main magnet is sandwiched between the pole and the lower clamp.

7. The sound device as described in claim 1, wherein the diaphragm assembly also includes a seal set on the outside of the diaphragm holder.

8. The sound device as described in claim 1, wherein the direction of the curved concave of the folded ring part is in the direction close to the coil.

9. The sound device as described in claim 1, wherein the waterproof breathable film includes a waterproof layer and a metal mesh layer, the waterproof layer is provided on the side of the metal mesh layer away from the magnetic system.

* * * * *